United States Patent
Miyata et al.

(10) Patent No.: US 9,076,491 B2
(45) Date of Patent: Jul. 7, 2015

(54) AUDIO DATA INPUTTING APPARATUS AND AUDIO DATA OUTPUTTING APPARATUS

(75) Inventors: Tomomi Miyata, Hamamatsu (JP); Akihiko Ohta, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 311 days.

(21) Appl. No.: 13/431,222

(22) Filed: Mar. 27, 2012

(65) Prior Publication Data
US 2012/0253491 A1    Oct. 4, 2012

(30) Foreign Application Priority Data

Mar. 28, 2011    (JP) .................................. 2011-70787

(51) Int. Cl.
G06F 17/00    (2006.01)
G11B 20/10    (2006.01)

(52) U.S. Cl.
CPC ... *G11B 20/10527* (2013.01); *G11B 2020/10546* (2013.01); *G11B 2020/10638* (2013.01); *G11B 2020/10731* (2013.01); *G11B 2020/10759* (2013.01)

(58) Field of Classification Search
USPC ........... 700/94; 381/119; 369/1–12; 386/295; 710/52, 56, 310
See application file for complete search history.

(56) References Cited

U.S. PATENT DOCUMENTS

| 8,010,692 B1 * | 8/2011 | Shanson et al. ............... 709/231 |
| 2003/0121401 A1 * | 7/2003 | Ito ................................... 84/625 |
| 2004/0165486 A1 | 8/2004 | Ueki |
| 2007/0160348 A1 | 7/2007 | Cho et al. |

FOREIGN PATENT DOCUMENTS

| CN | 1426047 A | 6/2003 |
| CN | 1947196 A | 4/2007 |
| CN | 101131849 A | 2/2008 |
| JP | 2005-292375 A | 10/2005 |

OTHER PUBLICATIONS

Chinese Notification of the First Office Action mailed Jun. 4, 2014 for CN Application No. 201210088543.4, with English translation, 21 pages.
Chinese Search Report mailed Jun. 4, 2014, for Application No. 2012100885434, with English translation, four pages.

* cited by examiner

*Primary Examiner* — Andrew C Flanders
(74) *Attorney, Agent, or Firm* — Morrison & Foerster LLP

(57) ABSTRACT

As for an audio data outputting apparatus and an audio data inputting apparatus for performing processing on audio data to transfer the audio data at each predetermined frame period, the processing on audio data performed at each frame period is done by hardware other than a CPU so that the CPU will not be interrupted at each frame period. In a case of transfer of audio data from a host to the audio data outputting apparatus, a reproduction control portion controls the data transfer in which a reception buffer and a reproduction buffer are involved, also controlling a receiving portion and a processing portion (DSP). In a case of transfer of audio data from the audio inputting apparatus to the host, a recording control portion controls the data transfer in which a transmission buffer and a recording buffer are involved, also controlling a transmitting portion and a processing portion.

14 Claims, 9 Drawing Sheets flowchart of process executed at power-on

AUDIO DATA INPUTTING APPARATUS AND AUDIO DATA OUTPUTTING APPARATUS

BACKGROUND OF THE INVENTION

1. Field of the Invention

The present invention relates to an audio data inputting apparatus and an audio data outputting apparatus which are connected to a PC by a general-purpose interface such as USB, and offer a capability of inputting/outputting audio signals (audio data).

2. Description of the Related Art

Conventionally, general-purpose USB interface (I/O) circuits (transceivers and endpoint controllers) capable of audio/video streaming are offered by various companies.

Furthermore, there is a conventional USB audio device which is connected to a personal computer (PC) with a USB cable, and offers a capability of inputting/outputting audio data for a music application such as Cubase and Protools which operates on an operating system (OS) such as Windows (trademark) and Mac OSX of the PC. The music application can use the USB audio device in order to externally input and externally output audio data. The music application records audio data externally input by use of the USB audio device on an audio track or externally outputs, by use of the USB audio device, the audio data reproduced on the audio track.

In order to allow the PC to externally output or externally input audio data by use of the USB audio device, USB isochronous transfer is used to stream audio data from the PC to the USB audio device, and to stream audio data from the USB audio device to the PC. On the audio device side, the streaming is realized by allowing a CPU of the audio device to control a USB interface and a Direct Memory Access (DMA) circuit at each USB frame period.

For instance, Japanese Unexamined Patent Publication No. 2005-292375 discloses an apparatus which receives, by a USB interface, audio data transmitted from a PC and reproduces the received audio data by interrupting a CPU at timing at which the audio data is transmitted so that the CPU will check the remaining amount of a buffer and control reproduction clock.

SUMMARY OF THE INVENTION

For USB data transfer, as described above, a CPU (a CPU of a device which serves as a node) is interrupted at each frame period (at each reception of an SOF packet) so that the CPU will control the USB interface and perform DMA control. The interruption occurs at each 1 millisecond (USB 1.1) or 125 microsecond (USB 2.0) which is quite a high frequency. In order to prevent discontinuance of streaming of audio data, furthermore, it is necessary to perform an interrupt within a certain period of time. In addition, the CPU is also required to control the entire device. For streaming of audio data for a plurality of channels, furthermore, it is necessary to set various parameters (tone volume, effect, etc.) for the respective channels in accordance with instructions made by a PC, further increasing the load on the CPU. Therefore, the CPU has to be a high-speed sophisticated processing unit. In general, such a CPU has a large circuit and requires high power consumption.

In order to solve the above-described problems, it is desired to realize a USB-connected device which is capable of streaming audio data without fail even with a low speed unsophisticated CPU.

An object of the present invention is to provide an audio data inputting apparatus and an audio data outputting apparatus which are connected by a standard such as USB to input and output audio data, the apparatuses realizing data transfer by streaming of audio data without fail even with a low speed and low power CPU.

In order to achieve the above-described object, the present invention provides an audio data outputting apparatus and an audio data inputting apparatus which transfer audio data by processing performed at each predetermined frame period, the apparatuses allowing hardware other than a CPU to perform the processing at the each predetermined frame period so that the CPU will not be interrupted at the each frame period.

More specifically, it is a feature of the present invention to provide an audio data outputting apparatus for inputting, from a host apparatus (100) at each predetermined frame period, audio data supplied via a communication bus (150), performing certain processing, and then outputting the audio data, the audio data outputting apparatus including a receiving portion (147) which has a first-in, first-out reception buffer (a first-in, first-out reception memory device), and performs, in accordance with a request for output transmitted from the host apparatus to the audio data outputting apparatus via the communication bus at the each frame period, receiving operation of receiving a plurality of samples of audio data for a plurality of channels transmitted from the host apparatus via the communication bus, and writing the received audio data for the channels into the reception buffer; a reproducing portion (144) which has a first-in, first-out reproduction buffer (a first-in, first-out reproduction memory device) and performs reproducing operation of reading out one sample of the audio data for the channels stored in the reproduction buffer to output the read data at each predetermined sampling period; a processor (131) which controls the entire audio data outputting apparatus; and a controlling portion (143) which controls respective operations of the receiving portion and the reproducing portion in accordance with an instruction from the processor, the processor (1) providing, when receiving, from the host apparatus via the communication bus, a parameter relating to audio data which is to be received, the parameter to the controlling portion; and (2) instructing, when receiving, from the host apparatus via the communication bus, an instruction to start output of audio data, the controlling portion to start operating; and the controlling portion clearing, in accordance with the instruction from the processor to start operating, the reception buffer and the reproduction buffer, enabling the receiving operation of the receiving portion, and stopping the reproducing operation of the reproducing portion, and thereafter at the each frame period (that is, at each detection of the timing of the frame period), (1) transferring, if the receiving portion has received audio data with the reproducing operation of the reproducing portion being stopped, the received audio data from the reception buffer to the reproduction buffer, and instructing, when audio data stored in the reproduction buffer reaches a certain amount, the reproducing portion to start the reproducing operation; (2) transferring, if the receiving portion has received audio data with the reproducing portion being in the reproducing operation, the received audio data from the reception buffer to the reproduction buffer; and (3) stopping, if the receiving portion is not receiving audio data, the reproducing operation of the reproducing portion.

As for the feature of the invention, at the each frame period, (4) if the receiving portion has received audio data with the reproduction buffer being full or short of data, the controlling portion may stop the reproducing operation of the reproducing portion, clear audio data stored in the reproduction buffer, and transfer the received audio data from the reception buffer to the reproduction buffer as an automatic recovery process. In this case, the processor may instruct the controlling portion to enable or disable the automatic recovery process; and in a state where the automatic recovery process is enabled, the controlling portion may perform the operation of (4), whereas in a state where the automatic recovery process is disabled, the controlling portion may stop the operation performed at the each frame period (that is, at each detection of the timing of the frame period) instead of performing the operation of (4) and thereafter keep stopping the operation.

As for the feature of the invention, furthermore, when the processor receives, from the host apparatus via the communication bus, an instruction to stop output, the processor may instruct, in response to the instruction, the controlling portion to stop operating; and in response to the instruction to stop operating, the controlling portion may stop the reproducing operation of the reproducing portion.

As for the feature of the invention, furthermore, the audio data outputting apparatus may further include a digital signal processing portion (139) which inputs audio data output from the reproducing portion, and individually performs signal processing for audio data of the respective channels at each sampling period, wherein the processor may set a parameter relating to audio data which is to be received.

As for the feature of the invention, furthermore, the parameter relating to audio data may include at least one of parameters indicative of sampling frequency of the audio data, the number of bits of a sample, and the number of channels.

In addition, it is the other feature of the present invention to provide an audio data inputting apparatus for externally inputting audio data, performing certain processing, and then supplying the audio data to a host apparatus (100) via a communication bus (150) at each predetermined frame period, the audio data inputting apparatus including a recording portion (142) which has a first-in, first-out recording buffer (a first-in, first-out recording memory device), and performs recording operation of writing one sample of the externally input audio data for a plurality of channels into the recording buffer at each predetermined sampling period; a transmitting portion (146) which has a first-in, first-out transmission buffer (a first-in, first-out transmission memory device), and performs, in accordance with a request for input transmitted from the host apparatus to the audio data inputting apparatus via the communication bus at the each frame period, transmitting operation of transmitting a plurality of samples of audio data for the plurality of channels stored in the transmission buffer to the host apparatus via the communication bus; a processor (131) which controls the entire audio data inputting apparatus; and a controlling portion (141) which controls respective operations of the transmitting portion and the recording portion in accordance with an instruction from the processor, the processor (1) providing, when receiving, from the host apparatus via the communication bus, a parameter relating to audio data which is to be transmitted, the parameter to the controlling portion; and (2) instructing, when receiving, from the host apparatus via the communication bus, an instruction to start input of audio data, the controlling portion to start operating; and the controlling portion clearing, in accordance with the instruction from the processor to start operating, the transmission buffer and the recording buffer, disabling the transmitting operation of the transmitting portion, stopping the recording operation of the recording portion, and thereafter at the each frame period (that is, at each detection of the timing of the frame period), (1) instructing, if the recording operation of the recording portion is being stopped, the recording portion to start the recording operation; (2) transferring, if the recording portion is in the recording operation with the transmitting operation of the transmitting portion being disabled, the audio data stored in the recording buffer to the transmission buffer, and enabling, if audio data stored in the transmission buffer reaches a certain amount, the transmitting operation of the transmitting portion; and (3) transferring, if the recording portion is in the recording operation with the transmitting operation of the transmitting portion being enabled and if the audio data inputting apparatus receives the request for input transmitted from the host apparatus, audio data stored in the recording buffer to the transmission buffer.

As for the other feature of the invention, at the each frame period, (4) if the recording portion is in the recording operation with the transmitting operation of the transmitting portion being enabled and if the audio data inputting apparatus does not receive the request for input transmitted from the host apparatus, the controlling portion may (a) delete audio data for a frame period stored in the transmission buffer and transfers audio data stored in the recording buffer to the transmission buffer, or (b) deletes audio data for a frame period stored in the recording buffer. In this case, the processor may instruct the controlling portion which selection to perform, the above-described (a) or (b) in the case of (4); and in accordance with the instruction, the controlling portion may perform either the above-described (a) or (b) in the case of (4).

As for the other feature of the invention, furthermore, at the each frame period, (5) if the recording portion is in the recording operation with the transmitting operation of the transmitting portion being enabled and if the recording buffer is full or short of data, the controlling portion may disable the transmitting operation of the transmitting portion, and clears audio data stored in the recording buffer and transmission buffer as an automatic recovery process. In this case, the processor may instruct the controlling portion to enable or disable the automatic recovery process; and in a state where the automatic recovery process is enabled, the controlling portion may perform the operation of (5), whereas in a state where the automatic recovery process is disabled, the controlling portion may stop the operation performed at the each frame period (that is, at each detection of the timing of the frame period) instead of the operation of (5) and thereafter keep stopping the operation.

As for the other feature of the invention, furthermore, when the processor receives, from the host apparatus via the communication bus, an instruction to stop input, the processor may instruct, in response to the instruction, the controlling portion to stop operating; and in response to the instruction to stop operating, the controlling portion may stop the recording operation of the recording portion.

As for the other feature of the invention as well, furthermore, the audio data inputting apparatus may further include a digital signal processing portion (139) which inputs the externally input audio data, individually performs signal processing for audio data of the respective channels at each sampling period, and outputs the processed audio data to the recording portion, wherein the processor may set a parameter relating to audio data which is to be received.

As for the other feature of the invention as well, furthermore, the parameter relating to audio data may include at least one of parameters indicative of sampling frequency of the audio data, the number of bits of a sample, and the number of channels.

According to the present invention, in a case where audio data output from the host apparatus is input to the apparatus of the present invention and in a case as well where audio data output from the apparatus of the invention is input to the host apparatus, the processing which is to be performed at each frame period (that is, at each detection of the timing of the frame period) is done appropriately by the controlling portions (the reproduction control portion 143 and the recording control portion 141), so that the processing is to be done by a block other than the processor. Because even at each frame period, that is, at each detection of the timing of frame period, therefore, the processor is not required to handle interrupts, the processor can be a low speed unsophisticated processor. Furthermore, the processing ability of the processor can be divided not only to inputting/outputting of audio data but also to other processing. Even in a case where the buffer is full or short of data, and in a case of a problem with transfer of audio data from or to the host apparatus, particularly, the apparatuses of the present invention can be automatically recovered by the control of the controlling portion without placing burden on the processor.

BRIEF DESCRIPTION OF THE DRAWINGS

FIG. 5 is a flowchart of a process carried out at power-on;

DESCRIPTION OF THE PREFERRED EMBODIMENT

An embodiment of the present invention will now be described with reference to the drawings.

Figure 1:
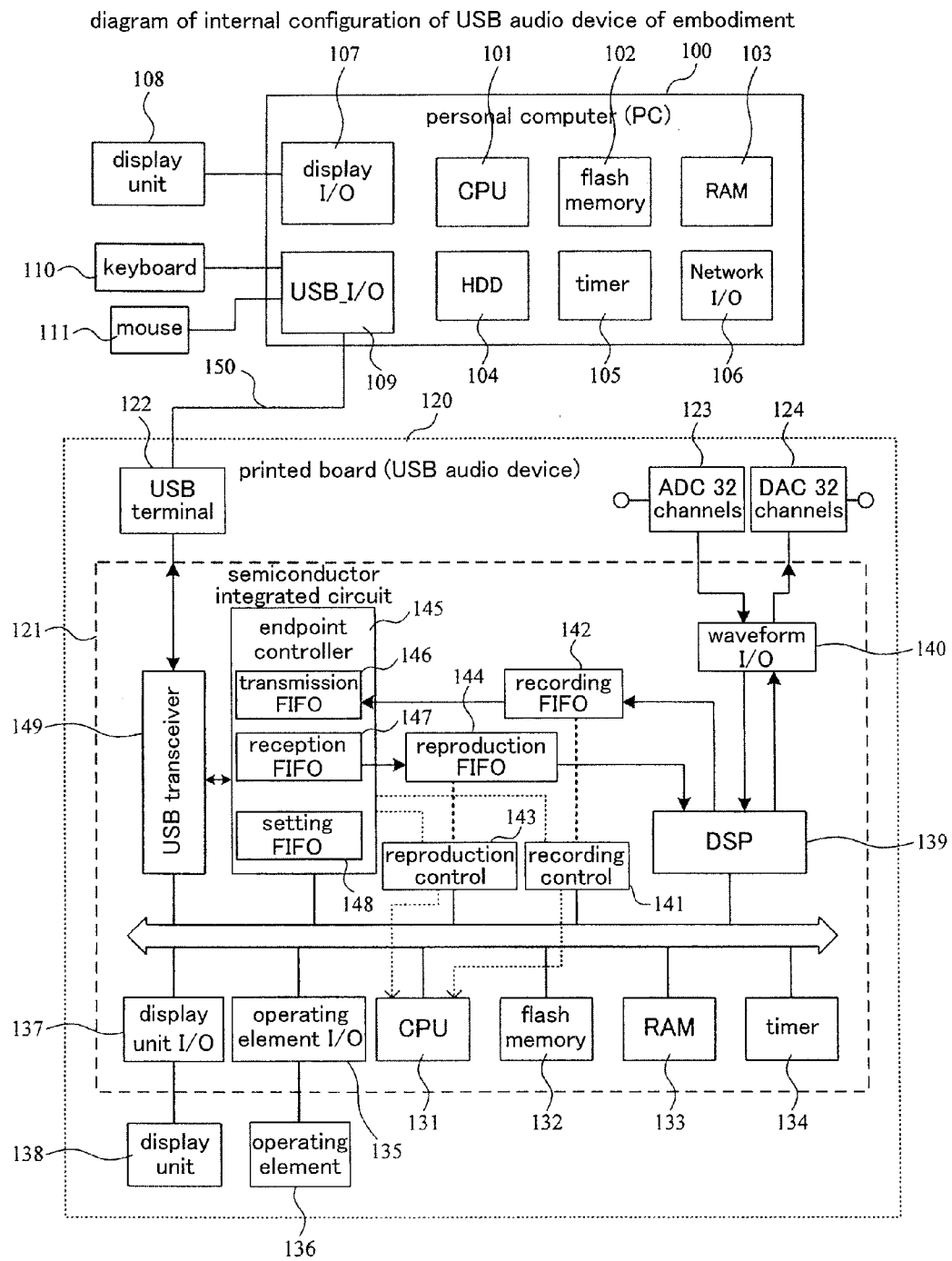
FIG. 1 is an internal configuration of a USB audio device of an embodiment.

FIG. 1 indicates an internal configuration of a USB (Universal Serial Bus) audio device which is an embodiment of the invention. A personal computer (PC) 100 serves as a host, while a USB audio device 120 is connected to the PC 100 with a USB cable 150. The embodiment of the present invention will be explained as an example in which USB 1.1 is employed for transmission of data between the PC 100 and the USB audio device 120.

The PC 100 has a central processing unit (CPU) 101, a flash memory 102, a random-access memory (RAM) 103, a hard disk (HDD) 104, a timer 105, a network input/output interface (I/O) 106, a display unit I/O 107, and a USB I/O 109. The CPU 101 is a processing unit which controls the entire operation of the PC 100 by carrying out programs stored in the RAM 103 and the like. The flash memory 102 and the HDD 104 are nonvolatile storage devices which store various kinds of programs and data. The timer 105 is a timer circuit for measuring time. The network I/O 106 is an interface for connecting the PC 100 to a network such as a local area network (LAN). To the display unit I/O 107, a display unit (display) 108 is connected so that various kinds of information will be displayed on the display unit 108 under instructions from the CPU 101. To the USB I/O 109, a keyboard 110, a mouse 111 and the USB audio device 120 are connected.

On the PC 100, a music application such as DAW (Digital Audio Workstation) is executed to allow the PC 100 to serve as an apparatus which realizes capabilities such as a capability of recording/reproducing audio data, a capability of creating/editing audio data, a mixing capability and a sequencer capability.

The USB audio device (hereafter simply referred to as "device") 120 is configured such that a USB terminal 122, an analog-to-digital converter (ADC) 123, a digital-to-analog converter (DAC) 124, a semiconductor integrated circuit 121, operating elements 136, and a display unit 138 are arranged on a printed board. The semiconductor integrated circuit 121, which is a chip of integrated circuit has a CPU 131, a flash memory 132, a RAM 133, a timer 134, an operating element I/O 135, a display unit I/O 137, a DSP 139, a waveform I/O 140, a recoding control portion 141, a recording FIFO 142, a reproduction control portion 143, a reproduction FIFO 144, an endpoint controller 145 and a USB transceiver 149.

The CPU 131 is a processing unit which controls the entire operation of the integrated circuit 121. The flash memory 132 is a nonvolatile storage means which stores programs that the CPU 131 executes, microprograms that the DSP 139 executes, and various kinds of parameter data. The RAM 133 is a volatile working memory for storing programs and data which the CPU 131 executes or uses. The timer 134 generates certain clock signals and supplies the generated clock signals to respective parts of the integrated circuit 121. The operating element I/O 135 and the display unit I/O 137 are interfaces for connecting the operating elements 136 and the display unit 138, respectively. By use of the operating elements 136, various kinds of instructions provided for the integrated circuit 121 are input. On the display unit 138, various kinds of data relating to the integrated circuit 121 are displayed.

The DSP 139 performs signal processing for audio data by operating in accordance with the microprograms and coefficient data set by the CPU 131 under the control of the CPU 131. The DSP 139 can process audio data for a plurality of channels by time sharing. The DSP 139 has two paths for inputting/outputting audio data: a path for externally inputting/outputting audio data via the waveform I/O 140, and a path for inputting/outputting audio data between the PC 100 via the USB terminal 122.

The waveform I/O 140 realizes a capability of inputting/outputting audio data and the like by a serial interface (other than USB). The ADC 123 converts analog audio signals for 32 channels input in parallel by microphone input, line input or the like to digital audio signals (audio data), respectively, and further converts the digital audio signals to time-shared serial data for 32 channels to output the serial data to the waveform I/O 140. The waveform I/O 140 converts the input serial data to parallel audio data for 32 channels, and writes the converted audio data into an input register of the DSP 139 to deliver the audio data to the DSP 139. At each certain sampling period, the DSP 139 performs signal processing on audio data for a plurality of channels written into the input register at the previous sampling period, and then writes the resultant audio data on the channels into an output register as audio data which is to be read out at the next sampling period. At each sampling period, furthermore, the waveform I/O 140 reads out, by time division, parallel audio sample data for the 32 channels processed by the DSP 139, converts the read audio sample data to time-shared serial data for the 32 channels, and outputs the converted serial data to the DAC 124. The DAC 124 converts the input serial data to parallel audio data for 32 channels, further converts the parallel audio data to analog audio signals, and externally outputs the analog audio signals.

The recording FIFO 142 which is a FIFO for recording (a recording portion including a FIFO buffer memory device) retrieves a sample of audio data of each of a plurality of channels at each sampling period and outputs the retrieved audio data for the channels at each frame period. On the input side of the recording FIFO 142, the recording FIFO 142 has a DMA (Direct Memory Access) circuit (not shown) for retrieving audio data from a preceding block. On the output side, the recording FIFO 142 has a DMA circuit (not shown) for outputting audio data to a following block. The reproduction FIFO 144 is a FIFO (a reproduction portion including a FIFO buffer memory device) which retrieves audio data for the channels at each frame period and outputs a sample of the retrieved audio data of each of the channels at each sampling period. On the input side of the reproduction FIFO 144, the reproduction FIFO 144 has a DMA circuit (not shown) for retrieving audio data from a preceding block. On the output side, the reproduction FIFO 144 has a DMA circuit (not shown) for outputting audio data to a following block.

The integrated circuit 121 has a capability of inputting/outputting audio data and the like via the USB terminal 122 by a USB interface. The USB transceiver 149 is a circuit which takes charge of physical level of a USB communication protocol. The endpoint controller 145, which is internally provided with FIFO (First-In, First-Out) buffers 146 to 148 which are the endpoints in the USB protocol, is a circuit for controlling these buffers and controlling data transfer from or to the host.

The transmission FIFO 146 is a FIFO buffer (a transmission portion including a FIFO buffer memory device) which serves as an endpoint in data transfer from the integrated circuit 121 to the PC 100 (data transfer by pipe for isochronous transfer in the IN direction seen from the PC 100 which is the host). The recording FIFO 142 retrieves, from the output register of the DSP 139, audio samples for the channels that are expected to be output to the PC 100 at each sampling period by use of the DMA circuit of the input side. By repeating the retrieval of audio samples for a plurality of times, a certain amount of audio data is stored in the recording FIFO 142. The audio data stored in the recording FIFO 142 is transferred to the transmission FIFO 146 at certain timing by use of the DMA circuit of the output side. The above-described processing of transferring audio data from the DSP 139 to the transmission FIFO 146 via the recording FIFO 142 is realized by the DMA circuits on the input side and the output side of the recording FIFO 142 under the control of the recoding control portion 141 (the processing will be explained in detail later). The audio data stored in the transmission FIFO 146 is transferred to the PC 100 via the USB transceiver 149 and the USB terminal 122 in accordance with a USB protocol.

The reception FIFO 147 is a FIFO buffer (a transmission portion including a FIFO buffer memory device) which serves as an endpoint in data transfer from the PC 100 to the integrated circuit 121 (data transfer by pipe for isochronous transfer in the OUT direction seen from the PC 100 which is the host). Audio data (data for "the channels×a plurality of sampling periods") output from the PC 100 via the USB I/O 109 is stored in the reception FIFO 147 via the USB terminal 122 and the USB transceiver 149 in accordance with the USB protocol. The audio data for the channels stored in the reception FIFO 147 is transferred to the reproduction FIFO 144 at certain timing by the DMA circuit situated on the input side of the reproduction FIFO 144. The audio data for the channels transferred to the reproduction FIFO 144 is written into the input register of the DSP 139 at each sampling period by the DMA circuit situated on the output side of the reproduction FIFO 144. The above-described processing of transferring audio data from the reception FIFO 147 to the DSP 139 via the reproduction FIFO 144 is realized by the DMA circuits on the input side and the output side of the reproduction FIFO 144 under the control of the reproduction control portion 143 (the processing will be explained in detail later).

The setting FIFO 148 is a FIFO buffer (a setting portion including a FIFO buffer memory device) which serves as an endpoint 0 for transferring setup control data and setting parameters between the integrated circuit 121 and the PC 100. The transfer by use of the setting FIFO 148 is bidirectional data transfer using a protocol for USB control transfer. In a case where data is transmitted from the integrated circuit 121 to the PC 100, when the CPU 131 stores data which is to be transmitted in the setting FIFO 148, the data stored in the setting FIFO 148 is transmitted to the PC 100 by control transfer. Data transmitted from the PC 100 to the integrated circuit 121 by control transfer is stored in the setting FIFO 148. The CPU 131 can retrieve received data from the setting FIFO 148.

The device 120 having the above-described capability of inputting/outputting audio data and the like functions as a device for variously processing music data such as a mixer or effector, depending on what kind of signal processing the DSP 139 is to perform.

Figure 2:
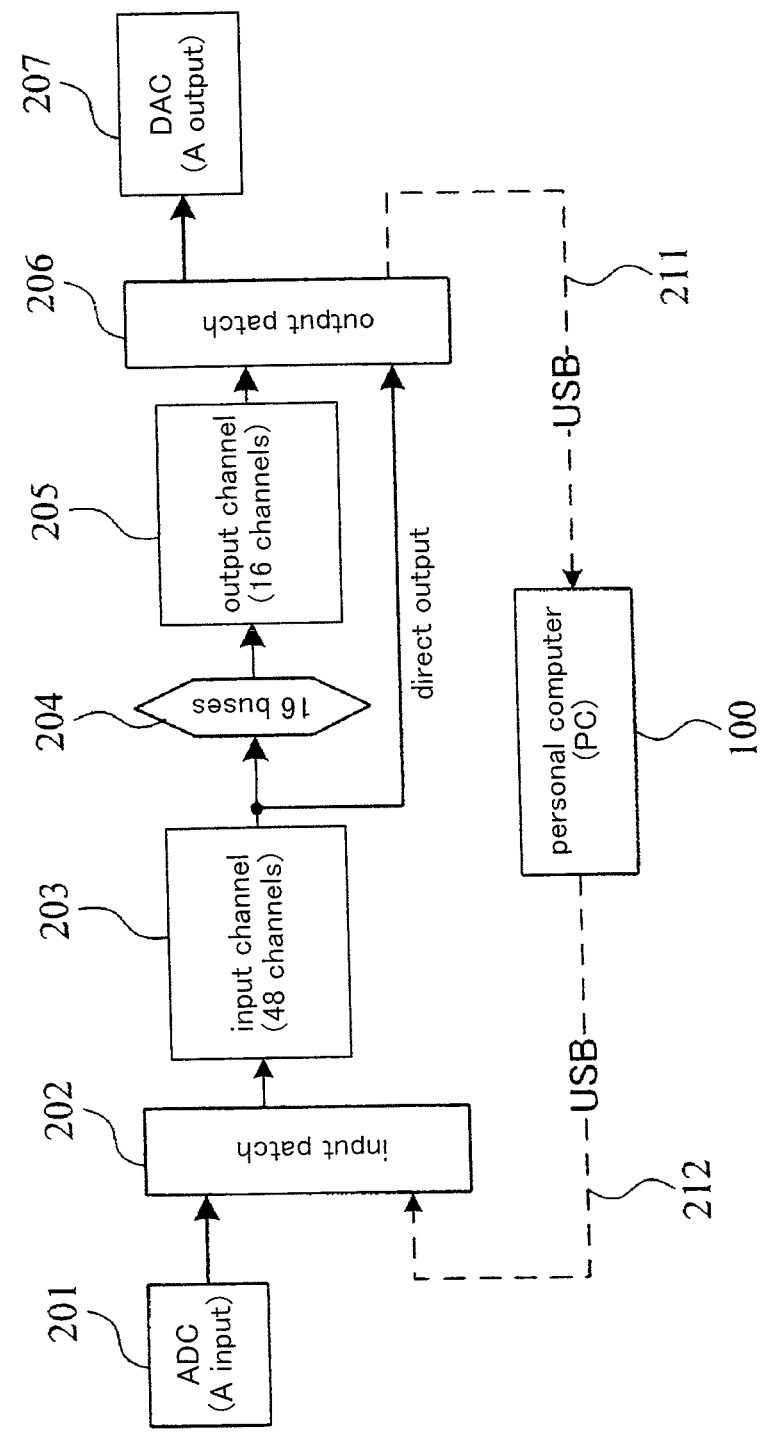
FIG. 2 is a block diagram of an example configuration of input/output of audio data and a mixer.

FIG. 2 is a functional block diagram indicative of a case where the device 120 functions as a mixer in the system of FIG. 1. An ADC 201 is equivalent to the ADC 123 and the waveform I/O 140 shown in FIG. 1. Audio data of a plurality of routes which have been analog-to-digital converted by the ADC 201 is input to an input patch 202. A USB input 212 represents audio data (the number of channels is arbitrary) input from the PC 100 to the device 120 shown in FIG. 1 via the USB interface. The input patch 202 establishes user's desired connections by which audio data input from the ADC 201 or the USB input 212 are assigned to channels of an input channel 203 which has 48 channels. The connections can be made by a user as the user desires. The input channel 203 conducts various adjustments for input audio data such as level control and control of frequency response. Audio data input to user's desired channels of the input channel 203 can be output to a mix bus 204 having 16 buses so that the audio data will be mixed on the mix bus 204 as the user desires.

The mixed results are output to an output channel 205 having 16 channels which correspond to the 16 buses of the mix bus 204, respectively. The output channel 205 having 16 channels conduct various adjustments necessary on the output side. The outputs of the output channel 205 are input to an output patch 206. The output patch 206 establishes connections as the user desires by assigning audio data output from the output channel 205 or audio data directly output from the input channel 203 to a user's desired output route of a DAC 207 or to a USB output 211. The USB output 211 represents audio data (the number of channels is arbitrary) output from the device 120 to the PC 100 shown in FIG. 1 via the USB interface. Respective functions of respective blocks ranging from the input patch 202 to the output patch 206 are realized by the DSP 139 shown in FIG. 1. The DAC 207 is equivalent to the waveform I/O 140 and the DAC 124 shown in FIG. 1. Audio data of a plurality of routes input to the DAC 207 is digital-to-analog converted to be externally output.

Supposing a music application for performing a capability of recording/reproducing audio data is carried out on the PC 100, for example, audio data output from the device 120 serving as a mixer can be recorded (hard disk recording) on the PC 100, or audio data reproduced on the PC 100 can be output to the device 120 so that the audio data can be mixed by the device 120.

Figure 3:
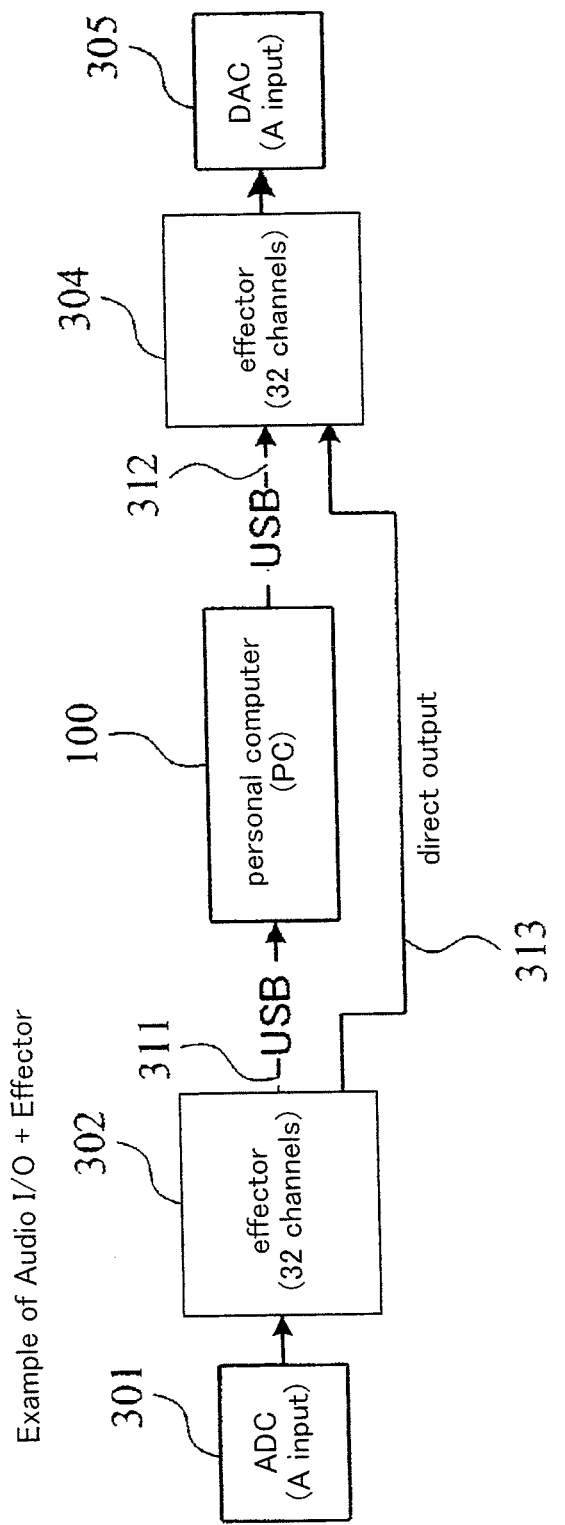
FIG. 3 is a block diagram of an example configuration of input/output of audio data and an effector.

FIG. 3 is a functional block diagram indicative of a case where the device 120 functions as an effector in the system shown in FIG. 1. An ADC 301 is equivalent to the ADC 123 and the waveform I/O 140 of FIG. 1. Audio data of a plurality of routes which have been analog-to-digital converted by the ADC 301 is input to an effector (32 channels) 302. The function of the effector 302, which adds various kinds of effects to input audio data, is realized by the DSP 139 shown in FIG. 1. Audio data output from the effector 302 can be output to the PC 100 via a USB output 311, or to an effector 304 via a direct output 313. The USB output 311 represents audio data (the number of channels is arbitrary) output from the device 120 to the PC 100 shown in FIG. 1 via a USB interface.

Audio data output from the PC 100 can be input to the effector 304 by a USB input 312. The USB input 312 represents audio data (the number of channels is arbitrary) input from the PC 100 to the device 120 shown in FIG. 1 via the USB interface. The effector 304 is an effector which is similar to the effector 302 and is realized by the DSP 139 shown in FIG. 1. Therefore, the direct output 313 is equivalent to establishing, within the DSP 139, a connection for inputting the output by certain effect processing to different effect processing. The output by the effector 304 is delivered to a DAC 305. The DAC 305 is equivalent to the DAC 124 and the waveform I/O 140 shown in FIG. 1. Audio data for a plurality of routes input to the DAC 305 is digital-to-analog converted to be externally output. The above-described effectors 302, 304 may have channels in which input audio data is directly passed through without adding any effects.

Supposing a music application for performing a capability of recording/reproducing audio data is carried out on the PC 100, for example, effect-added audio data output from the device 120 serving as an effector can be recorded on the PC 100, or audio data reproduced on the PC 100 can be output to the device 120 to add effects to the audio data.

Figure 4:
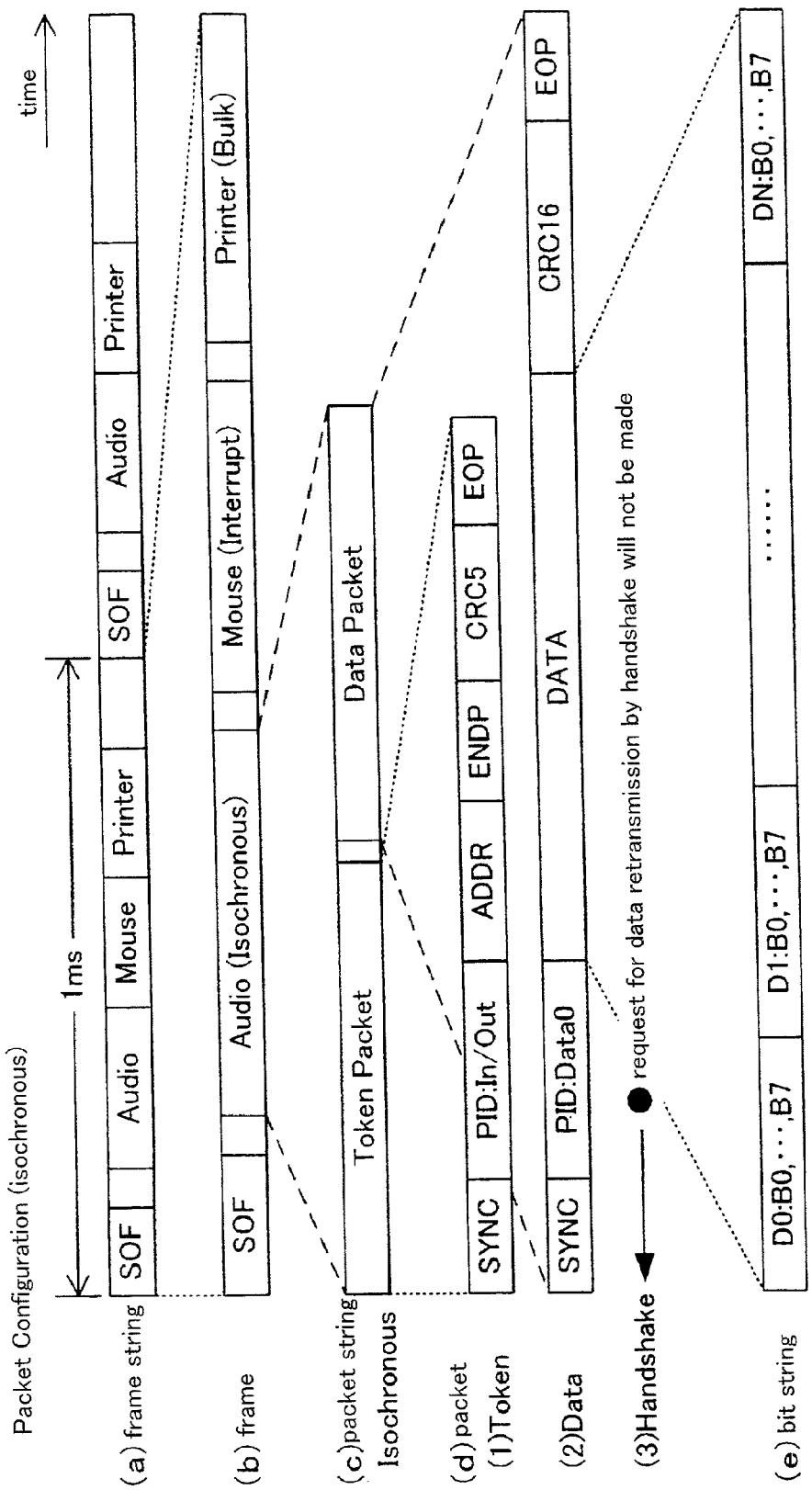
FIG. 4 is a configuration of packets.

FIG. 4 indicates a configuration of packets transmitted/received between the PC 100 (host) and the integrated circuit 121 of the device 120 shown in FIG. 1. FIG. 4(*a*) indicates a configuration of a frame repeatedly transferred at a cycle of 1 ms (millisecond) in accordance with the USB standard. A frame is configured by a plurality of transactions which start with a packet referred to as "SOF (start of frame)". In some cases, as indicated in FIGS. 4(*a*) and (*b*), transactions include not only a transaction (Audio) which transfers audio data which is to be transmitted/received by isochronous transfer, but also a transaction (Mouse) which transfers data on mouse by interrupt transfer, and a transaction (Printer) which transfers data on printer by bulk transfer. The host broadcasts the SOF to all the devices connected to USB cables at the top of a frame, and schedules control transfer, bulk transfer, interrupt transfer and isochronous transfer in accordance with the arrangement of the transactions which follow the SOF of the frame. The isochronous transfer used for transfer of audio data is scheduled so that the isochronous transfer is prioritized in order to guarantee an amount of data per a certain amount of time.

FIG. 4(*c*) indicates a packet string which configures a transaction of audio data by isochronous transfer. The packet string is formed of a token packet and a data packet.

FIG. 4(*d*)(1) indicates a configuration of the token packet which the host broadcasts. "SYNC" is data of 1 byte placed at the top of the packet for synchronization. "PID (packet identifier)" is data indicative of the type of the packet. In PID, either "In (indicative of a token requesting data transfer from the device to the host, that is, a code indicative of a "request for output")" or "Out (indicative of a token requesting data transfer from the host to the device, that is, a code indicative of a "request for input")" is set. "ADDR" is a device address which identifies the device. "ENDP" is data of 4 bits indicative of an endpoint number which identifies an endpoint. "CRC5" is a CRC check code of 5 bits. "EOP" indicates the end of the packet.

FIG. 4(*d*)(2) indicates a configuration of the data packet. "SYNC" and "EOP" are similar to those explained in the above-described token packet. In "PID", a code (Data0) indicating that the packet is a data packet is set. "CRC16" is a CRC check code of 16 bits. "DATA" is data transferred from the host to the device or from the device to the host. As indicated in FIG. 4(*e*), "DATA" has to be data having a desired length of 0 to 1023 bytes set in bytes. In this embodiment, "DATA" has audio data for up to 32 channels for a plurality of sampling periods.

In a case where "In" is set in the "PID" of the token packet of FIG. 4(*d*)(1) broadcast by the host, data is to be transferred from the device to the host by the data packet which follows the token packet. In this case, the device identified in accordance with "ADDR" included in the token packet retrieves the token, so that a data packet having, as DATA, data stored in the FIFO buffer of an endpoint identified in accordance with ENDP of the token packet is generated to be transmitted to the host.

In a case where "Out" is set in the "PID" of the token packet of FIG. 4(*d*)(1) broadcast by the host, data is to be transferred from the host to the device by the data packet which follows the token packet. In this case, the device identified in accordance with "ADDR" included in the token packet retrieves the token, receives the data packet which follows the token packet and is transmitted from the host, and retrieves data stored in DATA of the data packet into a FIFO buffer of the endpoint identified in accordance with ENDP of the token packet.

As indicated in FIG. 4(*d*)(3), a data retransmission request by handshake will not be made for isochronous transfer. Although each frame shown in FIG. 4(*b*) has one audio transaction, each frame may have a plurality of audio transactions to allow time-shared bidirectional audio transfer between the PC 100 (host) and the device 120.

Figure 5:
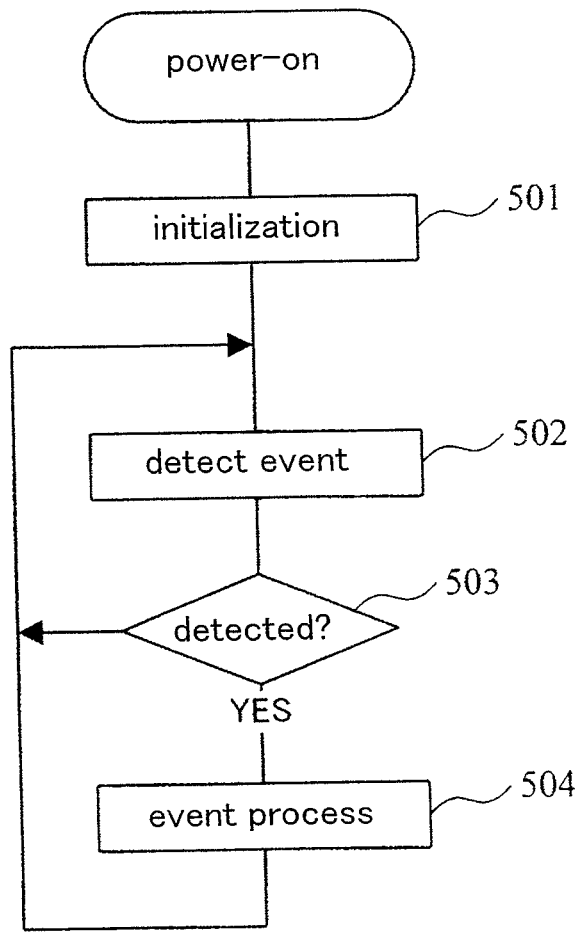

FIG. 5 is a flowchart of a main routine executed by the CPU 131 when the power of the device 120 is turned on or when the device 120 is connected to the PC 100 with the USB cable 150. After initialization of step 501, the CPU 131 detects an event in step 502. When any event has been detected, the CPU 131 proceeds from step 503 to step 504 to perform event processing corresponding to the detected event. Then, the CPU 131 repeats the steps 502 to 504.

In the initialization of step 501, the CPU 131 works with the USB I/O 109 and a device driver which operate on the PC 100 to configure the device 120 by use of control transfer. In this configuration, configuration data (a descriptor previously stored in a nonvolatile storage means of the integrated circuit 121) is transferred from the integrated circuit 121 of the device 120 to the PC 100 by control transfer, whereas the PC 100 checks the data, and then transmits a setting command to the integrated circuit 121 by control transfer. By this configuration, a device address is assigned to the integrated circuit 121 (or the device 120) so that pipes for transferring audio data and a transfer mode can be set.

The provided pipes are a pipe for transferring data from the PC 100 to the integrated circuit 121 (an outward pipe seen from the host side) and a pipe for transferring data from the integrated circuit 121 to the PC 100 (an inward pipe seen from the host side). Hereafter, the above-described outward pipe will be referred to as "OUT pipe", while the above-described inward pipe will be referred to as "IN pipe". In addition, a token broadcast from the PC 100 by data transfer with the OUT pipe will be referred to as "OUT token", while a token broadcast from the PC 100 by data transfer with IN pipe will be referred to as "IN token". By setting up the above-described pipes, an endpoint number corresponding to the transmission FIFO 146 is determined for the IN pipe, while an endpoint number corresponding to the reception FIFO 147 is determined for the OUT pipe. The transfer mode set for the IN pipe and the OUT pipe is isochronous transfer. These settings (the device address, endpoint numbers, transfer mode, and the like) are retained both by the PC 100 and the endpoint controller 145.

By the above-described configuration, the PC 100 and the device 120 are ready for communication by the determined mode. After the set-up of the configuration, the PC 100 can input audio data from the device 120 by isochronous transfer by designating the device address and the endpoint number of the IN pipe. In addition, the PC 100 can output audio data to the device 120 by isochronous transfer by designating the device address and the endpoint number of the OUT pipe.

Figure 6:
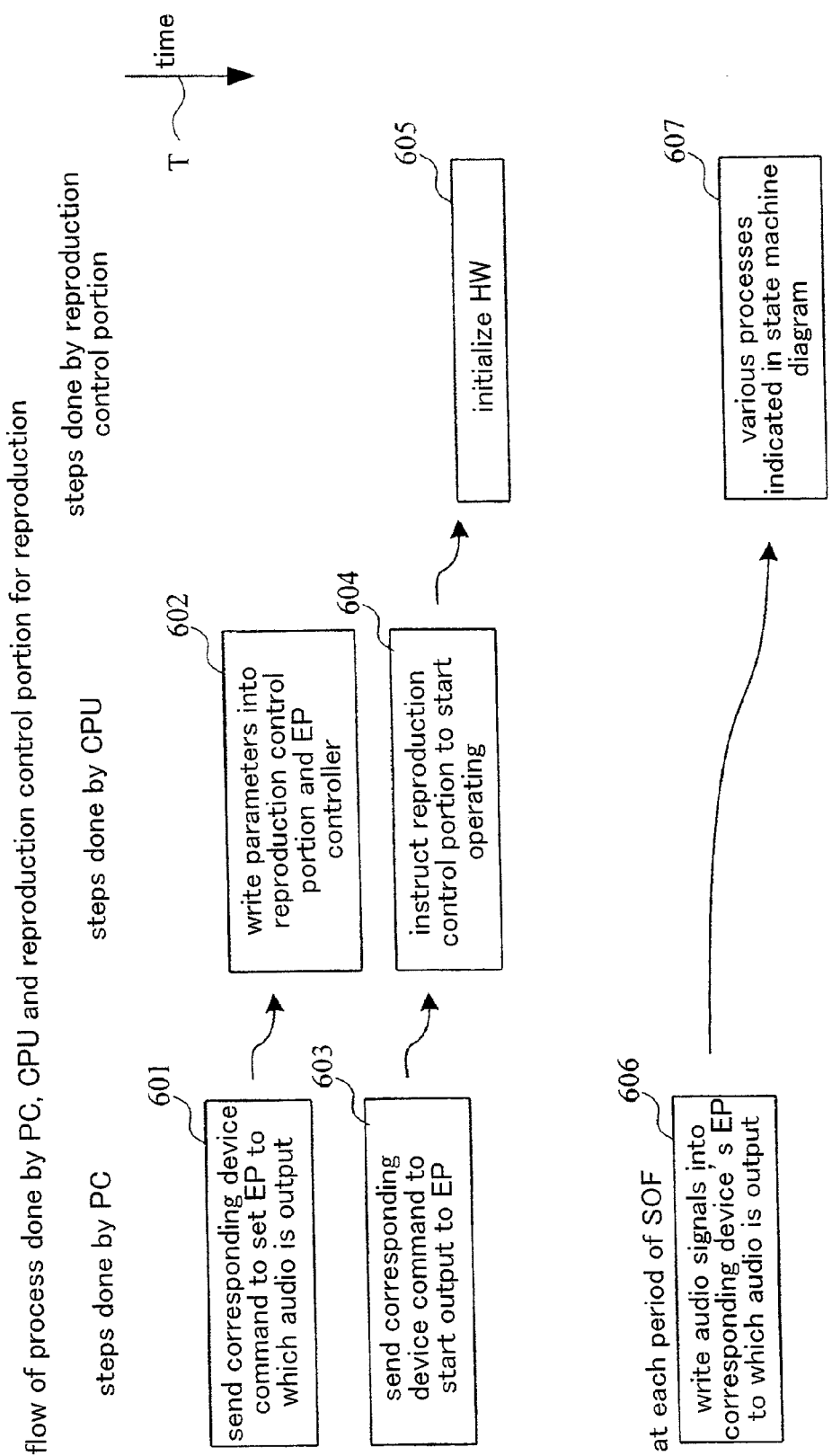
FIG. 6 is a flowchart of a procedure done by a PC, a CPU, and a reproduction control portion for reproduction.

FIG. 6 is a flow indicative of the general outline of a process for outputting audio data from the PC 100 to the device 120 after the configuration. First, the PC 100 transmits, to the device 120, a command for setting an outward endpoint for output of audio data (step 601). This is a step by which the PC 100 informs, by use of control transfer, the integrated circuit 121 of parameters relating to audio data which is to be transferred by use of the OUT pipe which has been already set by the above-described configuration. The parameters include sampling frequency of audio data which is to be transferred by the pipe, the number of bits of a sample, the number of output channels and the like. The CPU 131 which has received the command provides the informed parameters to the DSP 139 and the reproduction control portion 143 (representation of the parameters are appropriately changed) (step 602). Furthermore, an algorithm for use in the DSP 139 is also transmitted from the PC 100 to the device 120 so that the CPU 131 can transmit the algorithm to the DSP 139.

Next, the PC 100 transmits, to the device 120 by control transfer, a command indicating that the PC 100 starts outputting audio data to instruct the integrated circuit 121 to start operating to input audio data (step 603). The CPU 131 which received the command instructs the reproduction control portion 143 to start operating (step 604). The reproduction control portion 143 then starts operating by initializing hardware (step 605). After these steps, the PC 100 repeats a process for transmitting audio data which is to be subject to signal processing to the integrated circuit 121 of the device 120 by use of the OUT pipe (isochronous transmission process: a code executed here by the PC 100 is a command to write audio data into an endpoint (the reception FIFO 147) of the device 120 via the OUT pipe) (step 606). In response to the instruction, the reproduction control portion 143 carries out various processes indicated in a state machine diagram of FIG. 7 (step 607). In step 606, the PC 100 transmits a token packet (OUT token) which includes the PID indicative of OUT, the address ADDR assigned to the device 120, and the endpoint number ENDP assigned to the reception FIFO 147, and then transmits a data packet which includes audio data for a plurality of channels for one frame. On the basis of the ADDR and the ENDP of the OUT token, the integrated circuit 121 of the device 120 recognizes that the device 120 should receive the data packet which follows the token packet, and reads the audio data for the channels included in the data packet into the reception FIFO 147.

Figure 7:
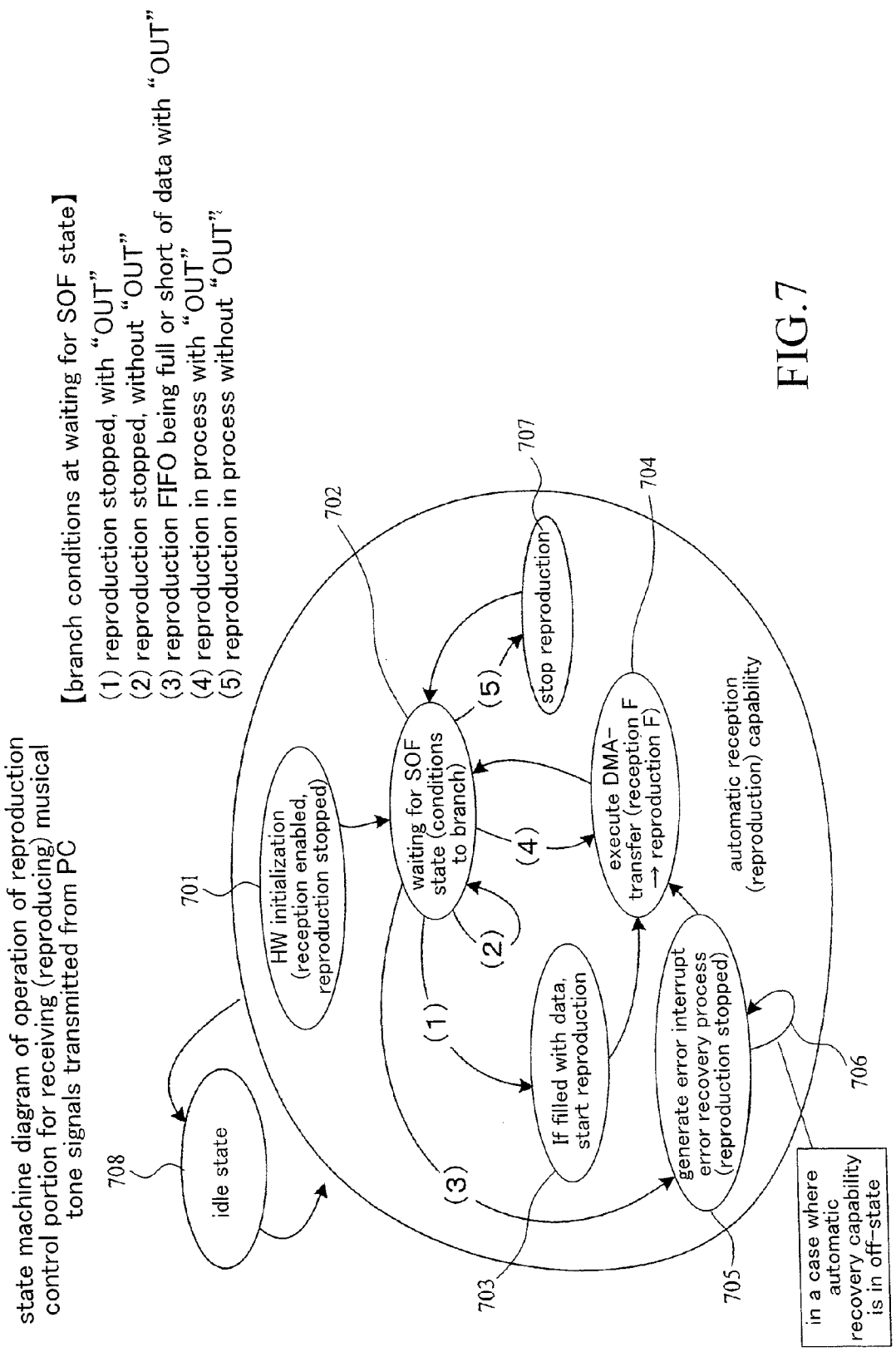
FIG. 7 is a state machine diagram indicative of operation of the reproduction control portion for receiving (reproducing) musical tone signals transmitted from the PC.

FIG. 7 is the state machine diagram indicative of the operation of the reproduction control portion 143 of a case in which the device 120 receives audio data from the PC 100. The term "reproduction" used in this specification indicates a case (Render) as a typical case in which the PC 100 transfers one frame of a series of audio data which the PC 100 stores to the device 120 at each frame period, whereas the device 120 externally outputs a sample at a sampling period. However, the series of audio data may not be necessarily "reproduced" by the PC 100 in accordance with an audio file, but may be input to the PC 100 by streaming from a different source (a different device, recorder or the like which is similar to the device 120).

In FIG. 7, after the configuration which follows the power-on of the system, the reproduction control portion 143 is in an idle state 708. When the steps 601 to 604 shown in FIG. 6 are then carried out for outputting audio data from the PC 100 to the device 120, the reproduction control portion 143 is instructed to start operating in accordance with the output start command in step 604. In response to the instruction, the reproduction control portion 143 moves from the idle state 708 to a hardware initialization 701 (step 605). By this initialization 701, the reception FIFO 147 and the reproduction FIFO 144 are cleared. By this initialization, furthermore, the endpoint controller 145 and the reproduction FIFO 144 are set at "reception enabled" and "reproduction stopped", respectively. The term, "reception enabled" indicates that the USB transceiver 149 and the endpoint controller 145 start operating to receive data (more specifically, start operating to receive audio data transmitted from the PC 100 by use of the OUT pipe to store the received data in the reception FIFO 147). The term, "reproduction stopped" indicates that the transmission of one audio sample of audio data stored in the reproduction FIFO 144 to the DSP 139 at each sampling period by the DMA circuit situated on the output side of the reproduction FIFO 144 is stopped. After the initialization 701, the reproduction control portion 143 moves to "waiting for SOF" state 702.

As explained in step 606 of FIG. 6, the PC 100 transmits audio data which is subject to signal processing to the integrated circuit 121 by use of the OUT pipe. Because the integrated circuit 121 side is set at "reception enabled", the integrated circuit 121 receives the audio data from the OUT pipe and stores the received audio data in the reception FIFO 147. When an SOF is received, and when an OUT token is received, the endpoint controller 145 informs the reproduction control portion 143 of the respective receptions. When an SOF is received, the reproduction control portion 143 detects frame period timing (more specifically, the SOF reception timing which is the boundary between frame periods) to move from the waiting for SOF state 702 to another state in accordance with branch conditions (1) to (5) shown in FIG. 7.

The condition (1) is a branch taken in a case where the SOF is received in a state of "reproduction stopped" with "OUT". Being with "OUT" indicates that an OUT token has been received in a frame immediately preceding the above-received SOF. In this case, it is supposed that there is received audio data in the reception FIFO 147. More specifically, the condition (1) is a case where the retrieval of audio data from the reproduction FIFO 144 by the DSP 139 is stopped, with audio data being stored in the reception FIFO 147. In the case of the condition (1), the reproduction control portion 143 proceeds to state 703 to check whether the reproduction FIFO 144 is filled with audio data of an amount sufficient enough to start reproduction. If the reproduction FIFO 144 is filled with a sufficient amount of audio data, the DMA circuit situated on the output side of the reproduction FIFO 144 is instructed to start reproduction (by the instruction, the reproduction FIFO 144 moves from "reproduction stopped" to "in process of reproduction"), so that the reproduction control portion 143 enters state 704. If the reproduction FIFO 144 has not been filled with a sufficient amount of audio data yet, the reproduction control portion 143 directly enters the state 704. In the state 704, the audio data stored in the reception FIFO 147 is DMA-transferred to the reproduction FIFO 144. Then, the reproduction control portion 143 returns to the waiting for SOF state 702. In the state 703, the DMA circuit situated on the output side of the reproduction FIFO 144 which has entered "in process of reproduction" continuously transfers (reproduces) one audio sample of the audio data for the channels stored in the reproduction FIFO 144 at each sampling period to the DSP 139 until the next instruction of "reproduction stopped".

The condition (2) is a branch taken in a case where the SOF is received in a state of "reproduction stopped" without "OUT". Being without "OUT" indicates that an OUT token including the address ADDR of the device 120 and the endpoint number ENDP of the reception FIFO 147 has not been received in a frame immediately preceding the above-received SOF. In this case, because any audio data has not been received, the reproduction control portion 143 directly returns to the waiting for SOF state 702.

The condition (3) is a branch taken in a case where the SOF is received in a state where the reproduction FIFO 144 is full or short of audio data, with "OUT". In a case where audio data has been written into the reproduction FIFO 144 by the DMA transfer of the state 704 to fill the reproduction FIFO 144 with data to return to the state 702 to receive an SOF, the condition (3) is taken. Although one sample of audio data stored in the reproduction FIFO 144 is supplied to the DSP 139 at each sampling period by the DMA circuit situated on the output side so that the audio data will be processed by the DSP 139, it is necessary that the reproduction FIFO 144 always has audio data of a certain amount or more in order to secure stable continuous signal processing by the DSP 139 (in the state 703, audio data for one frame (audio data of the certain amount or more) is charged into the reproduction FIFO 144). Therefore, the reproduction control portion 143 is to detect whether the audio data stored in the reproduction FIFO 144 falls short of the certain amount. When the shortage of audio data in the reproduction FIFO 144 is detected, it is determined that the reproduction FIFO 144 is short of audio data. In a case as well where the SOF is received in such a state, the condition (3) is to be taken.

In a case where any of these conditions is satisfied, the reproduction control portion 143 enters a state 705 to generate an error interrupt and to inform the CPU 131 of an error to perform an error recovery process. By the error recovery process, the DMA circuit situated on the output side of the reproduction FIFO 144 is instructed to "stop reproduction", while an initialization such as clearing (emptying) the reproduction FIFO 144 is performed. After the initialization, the reproduction control portion 143 continues its operation, restarting at the state 704. Although the sound is temporarily discontinued, as a result, the operation can be continued. The continuation of operation indicates that an automatic recovery capability is in on-state (enabled). The capability of automatically recovering from an error can be turned off (disabled). In a case where the automatic recovery capability is set in off-state, the stopped state is continued without the error recovery process as indicated in 706. The switching of the automatic recovery capability between on and off is instructed by the CPU 131. By the error recovery process, furthermore, the reproduction FIFO 144 is cleared, but the reception FIFO 147 will not be cleared. This is because if audio data is still stored in the reproduction FIFO 144 at the occurrence of an error, clearing of the reproduction FIFO 144 facilitates resumption of the following reproduction. As for the reception FIFO 147, however, because audio data stored in the reception FIFO 147 may be used for resumption of the following reproduction, the reception FIFO 147 will not be cleared in order to facilitate resumption of reproduction.

In the case of the condition (3) where the reproduction FIFO 144 is full, the reproduction may not be stopped by deleting a certain amount of data from the reproduction FIFO 144 to create vacant space to continue the operation. In the case of the condition (3) where the reproduction FIFO 144 is short of audio data, the reproduction may not be stopped by writing a certain amount of dummy audio data formed of samples of zero values into the reproduction FIFO 144 to continue the operation. In these cases, the sound will be interrupted, but the reproduction can be continued.

The condition (4) is a branch taken in a case of "in process of reproduction" with "OUT". In this case, the reproduction control portion 143 enters the state 704 to DMA-transfer a frame of audio data for the channels stored in the reception FIFO 147 to the reproduction FIFO 144 by the DMA circuit situated on the input side of the reproduction FIFO 144. The reproduction control portion 143 then returns to the waiting for SOF state 702.

The condition (5) is a branch taken in a case of "in process of reproduction" without "OUT". In this case, the reproduction control portion 143 enters a state 707 to bring the DMA circuit situated on the output side of the reproduction FIFO 144 to "reproduction stopped" state. Then, the reproduction control portion 143 returns to the waiting for SOF state 702. If an SOF is then received in a state with "OUT", the reproduction control portion 143 resumes its operation to take the branch of the condition (1) again.

A typical flow in which audio data transmitted from the PC 100 is received to be subjected to signal processing by the DSP 139 is as follows: First, the reproduction control portion 143 moves from the state 701 to the state 702 to take branch of the condition (1) to repeat the states 702→703→704→702 for some times to store audio data for a plurality of channels in the reproduction FIFO 144. When a certain amount of audio data has been accumulated, the reproduction of the audio data starts. The audio data for the channels reproduced by the DMA circuit situated on the output side of the reproduction FIFO 144 is supplied to the DSP 139 to be subjected to signal processing. After the start of reproduction, the branch of the condition (4) is taken to repeat the states 702→704→702 to continue, in parallel, the frame-by-frame transfer of sequentially received audio data from the reception FIFO 147 to the reproduction FIFO 144 by the DMA circuit situated on the input side of the reproduction FIFO 144 and the sample-by-sample transfer of audio data from the reproduction FIFO 144 to the DSP 139 by the DMA circuit of the output side. If an error caused by that the reproduction FIFO 144 is full or short of data during the repetition occurs, the branch of the condition (3) is taken to automatically perform the error recovery process. If the transmission from the PC 100 is interrupted, the branch of the condition (5) is taken to automatically "stop the reproduction".

Because the sampling frequency of audio data transferred from the PC 100, the number of bits of a sample, and the number of output channels have been provided to the DSP 139 and the reproduction control portion 143 at step 602 of FIG. 6, the reproduction control portion 143 is able to detect whether the audio data stored in the reproduction FIFO 144 matches with the provided sampling frequency, number of bits of a sample, and number of output channels. If such a "data size error" is detected, the branch of the condition (3) may be taken.

In a case, which is not indicated in FIGS. 6 and 7, where the PC 100 stops the output of audio data, an output stop command is transmitted to the device 120 by control transfer. In response to the command, the CPU 131 of the integrated circuit 121 instructs the reproduction control portion 143 to stop its operation. The reproduction control portion 143 which received the instructions turns to "reception disabled" and "reproduction stopped", while stopping the automatic reception (reproduction) capability to move to the idle state 708.

Figure 8:
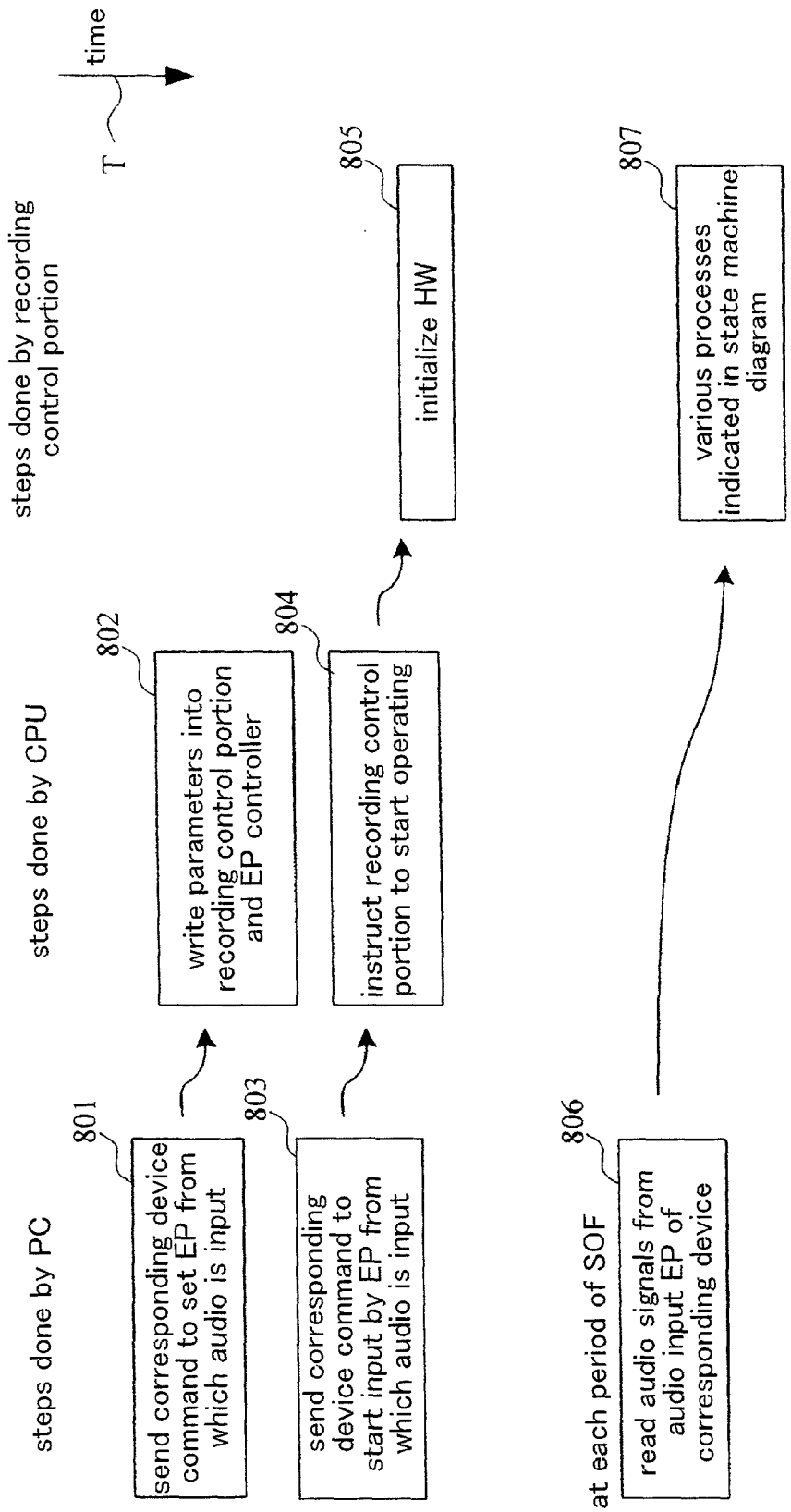
FIG. 8 is a flowchart of a procedure done by the PC, the CPU, and a recording control portion for recording.

FIG. 8 is a flow indicative of the general outline of a process for inputting audio data from the device 120 to the PC 100 after the configuration. First, the PC 100 transmits, to the device 120, a command to set an inward endpoint for input of audio data (step 801). This is a process by which the PC 100 informs, by use of control transfer, the integrated circuit 121 of parameters relating to audio data which is to be transferred by use of the IN pipe which has been already set by the above-described configuration. The parameters include sampling frequency of audio data which is to be transferred by the pipe, the number of bits of a sample, the number of output channels and the like. The CPU 131 which has received the command provides the informed parameters to the DSP 139 and the recording control portion 141 (representation of the parameters are appropriately changed) (step 802). In this case as well, furthermore, an algorithm for use in the DSP 139 is also transmitted from the PC 100 to the device 120 so that the CPU 131 can transmit the algorithm to the DSP 139.

Next, the PC 100 transmits, to the device 120 by control transfer, a command indicating that the PC 100 starts inputting audio data to instruct the integrated circuit 121 to start operating to output audio data (step 803). The CPU 131 which received the command instructs the recording control portion 141 to start operating (step 804). The recording control portion 141 then starts operating by initializing hardware (step 805). After these steps, the PC 100 repeats a process for transmitting an IN token to the integrated circuit 121 of the device 120 and receiving audio data transmitted by the integrated circuit 121 to follow the IN token by use of the IN pipe (isochronous reception process: a code executed here by the PC 100 is a command to read audio data from an endpoint (the transmission FIFO 146) of the device 120 via the IN pipe) (step 806). In step 806, the PC 100 transmits a token packet (OUT token) which includes the PID indicative of OUT, the address ADDR assigned to the device 120, and the endpoint number ENDP assigned to the transmission FIFO 146. On the basis of the ADDR and the ENDP of the OUT token, the device 120 recognizes that the device 120 should transmit a data packet next, and transmits the data packet including a frame of audio data for the channels. The PC 100 then retrieves the audio data from the transmitted data packet. The recording control portion 141 carries out various processes indicated in a state machine diagram of a FIG. 9 which will be explained next.

Figure 9:
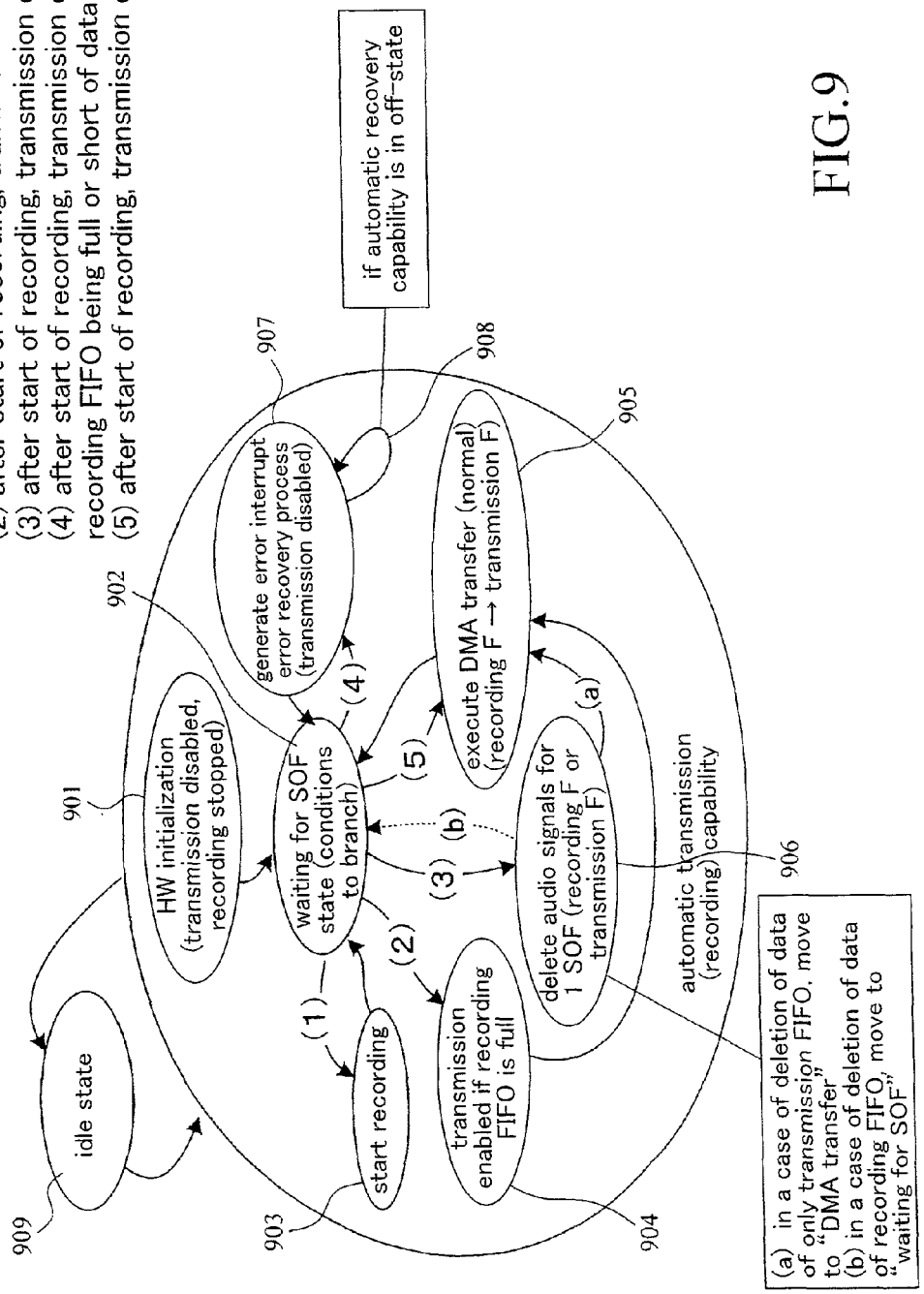
FIG. 9 is a state machine diagram indicative of operation of the recording control portion for transmitting (recording) musical tone signals to the PC.

FIG. 9 is the state machine diagram indicative of the operation of the recording control portion 141 of a case in which audio data is transmitted from the device 120 to the PC 100. The term "recording" used in this specification indicates a case (Capture) as a typical case in which a sample of audio data input to the device 120 at each sampling period is sequentially stored to transfer one frame of the audio data to the PC 100 at each frame period so that the PC 100 can connect the received audio data to reconstruct the series of audio data. However, the series of audio data may not be necessarily "recorded" by the PC 100 as an audio file, but may be output by streaming from the PC 100 to a different sink (a different device, recorder or the like which is similar to the device 120).

In FIG. 9, after the above-described configuration which follows the power-on of the system, the recording control portion 141 is in an idle state 909. When the steps 801 to 804 shown in FIG. 8 are then carried out in order to input audio data from the device 120 to the PC 100, the recording control portion 141 is instructed to start operating in accordance with the input start command in step 804. In response to the instruction, the recording control portion 141 moves from the idle state 909 to a hardware initialization 901 (step 805). By this initialization 901, the transmission FIFO 146 and the recording FIFO 142 are cleared. By this initialization, furthermore, the endpoint controller 145 and the recording FIFO 142 are set at "transmission disabled" and "recording stopped", respectively. The term, "transmission disabled" indicates that the USB transceiver 149 and the endpoint controller 145 will not perform transmission (more specifically, when the IN token is retrieved, the USB transceiver 149 and the endpoint controller 145 will not perform the operation of generating a data packet on the basis of the data stored in the transmission FIFO 146 and transmitting the data packet to the PC 100 by use of the IN pipe). In a case where the IN token is transmitted, however, because a data packet including audio data having no sounds for the channels is transmitted to the PC 100 instead of the data packet, a transaction does exists. The term, "recording stopped" indicates that the transfer of a sample of audio data for the channels stored in the output register of the DSP 139 to the recording FIFO 142 at each sampling period by the DMA circuit situated on the input side of the recording FIFO 142 is being stopped. After the initialization 901, the recording control portion 141 moves to a "waiting for SOF" state 902.

As explained in step 806 of FIG. 8, the PC 100 starts the operation of transmitting the IN token and receiving a data packet transmitted from the device 120 to follow the IN token. However, because the integrated circuit 121 side is still in the state of "transmission disabled", the reception of the IN token will not result in transmission of data stored in the transmission FIFO 146 (there is no data at this point in time). When an SOF is received, and when an IN token is received, the endpoint controller 145 informs the recording control portion 141 of the respective receptions. When an SOF is received, the recording control portion 141 detects frame period timing (more specifically, the SOF reception timing which is the boundary between frame periods) to move from the waiting for SOF state 902 to another state in accordance with branch conditions (1) to (5) shown in FIG. 9.

The condition (1) is a branch taken in a case of a "recording stopped" state which precedes the start of recording, that is, a case where an SOF is received in a state where the transfer of audio sample from the DSP 139 to the recording FIFO 142 by the DMA circuit of the input side of the recording FIFO 142 is stopped. In this case, the recording control portion 141 moves to a state 903 to start recording (moves from "recording stopped" to "in process of recording"). As a result, the operation of recording by the DMA circuit of the input side of the recording FIFO 142 starts, so that an audio sample of each channel is transferred from the output register of the DSP 139 to the recording FIFO 142 at each sampling period to be stored in the recording FIFO 142. By controlling the timing at which the recording control portion 141 moves from the "recording stopped" state to the state of "in process of recording", the amount (X: a predicted value; counted by frames) of audio samples stored in the recording FIFO 142 at the time of the start of transmission to the PC 100 (at the time of reception of an SOF which follows a few frames) can be adjusted. In a case of the recording FIFO 142 having the capacity of 2 frames, for example, it is preferable that the transition timing is the timing at which the time equivalent to half a frame has elapsed since the current SOF reception timing ($X=\frac{1}{2}$). In a case of the recording FIFO 142 having the capacity of 3 frames, for example, it is preferable that the recording control portion 141 moves to the state "in process of recording" at the current SOF reception timing ($X=1$). The most suitable amount X is calculated by $X=(S-1)/2$, with the capacity of the recording FIFO being defined as S. A delay time D which ranges from the SOF reception to the transition timing is calculated by $D=1-\text{Frac}(X)$ (Frac( ) is a function for retrieving a decimal fraction). After the state 903, the recording control portion 141 returns to the waiting for SOF state 902.

The condition (2) is a branch taken in a case where an SOF is received in a "in process of recording" and "transmission disabled" state. In this case, the recording control portion 141 moves to a state 904 to check whether the recording FIFO 142 has audio data of the certain amount X which is most suitable for starting transfer to the transmission FIFO 146. If audio data of the certain amount X is stored in the recording FIFO 142, the recording control portion 141 instructs the USB transceiver 149 and the endpoint controller 145 to start transmission (by the instruction, the endpoint controller 145 moves from "transmission disabled" to "transmission enabled"), and then moves to a state 905. If the audio data of the certain amount X has not been stored in the recording FIFO 142 yet, the recording control portion 141 directly moves to the state 905. In the state 905, a frame of audio data for the channels stored in the recording FIFO 142 is DMA-transferred to the transmission FIFO 146 by the DMA circuit of the output side. Then, the recording control portion 141 returns to the waiting for SOF state 902.

The condition (3) is a branch taken in a case where the SOF is received in a state of "in process of recording" and "transmission enabled" without "IN". Being without "IN" indicates that any IN token has not been received in a frame immediately preceding the above-received SOF. In this case, because the data stored in the transmission FIFO 146 will not be transmitted, there is a possibility of shortage of free space in the transmission FIFO 146 or the recording FIFO 142. Therefore, the recording control portion 141 moves to a state 906 to delete audio data of an amount which is to be transmitted in a frame. There are two deleting schemes, either of which is previously chosen. The first scheme is a scheme to delete an amount of audio data which can be transmitted in a frame from the transmission FIFO 146. In this case, the recording control portion 141 then moves to the state 905 as indicated in (a). Because the free space of the transmissions FIFO 146 has increased, the DMA transfer in the state 905 can be conducted. The second scheme is a scheme to delete an amount of audio data which can be transmitted in a frame from the recording FIFO 142. In this case, the recording control portion 141 then moves to the waiting for SOF state 902 as indicated in (b). Because the free space of the recording FIFO 142 has increased, writing from the DSP 139 to the recording FIFO 142 can be continued. The selection between the above-described (a) and (b) is done in accordance with instruction made by the CPU 131.

The condition (4) is a branch taken in a case where an SOF is received in a state of "in process of recording" and "transmission enabled", with the recording FIFO 142 being full or short of data. The branch of the condition (4) is to be taken in a case where because of the state of "in process of recording", audio samples of data of the respective channels are written into the recording FIFO 142 from the output register of the DSP 139 at respective sampling periods by the DMA circuit of the input side of the recording FIFO 142 to make the recording FIFO 142 so full that any data cannot be written, but the SOF is received. As for the audio data stored in the recording FIFO 142, by a basic procedure, audio data of an amount which can be transmitted in one frame is retrieved by the transmission FIFO 146 by the DMA transfer done in the state 905 to be transmitted to the host. In order to secure stable continuous transmission to the host, however, it is necessary that audio data of a certain amount or more is stored in the recording FIFO 142 at any time (in the state 904, audio data which is equivalent to one frame (the certain amount or more) is charged into the recording FIFO 142). Therefore, the recording control portion 141 is designed to detect whether audio data stored in the recording FIFO 142 is less than the certain amount. If it is detected that the audio data stored in the recording FIFO 142 is less than the certain amount, the recording FIFO 142 is judged as "being short of data". In a case as well where an SOF is received in that state, the condition (4) is to be taken.

In a case of the condition (4), the recording control portion 141 enters a state 907 to generate an error interrupt and to inform the CPU 131 of an error to perform an error recovery process. By the error recovery process, the transmission by the endpoint controller 145 and the like is made "transmission disabled", while recording from the DSP 139 to the recording FIFO 142 by the DMA circuit of the input side of the recording FIFO 142 is stopped (i.e., "recording stopped"). After initialization such as clearing (emptying) the transmission FIFO 146 and the recording FIFO 142, the recording control portion 141 returns to the state 902 to continue the operation. The continuation of the operation indicates that an automatic recovery capability is in on-state (enabled). The capability of automatically recovering from an error can be turned off (disabled). In a case where the automatic recovery capability is set in the off-state, the state where the operation is being stopped is continued without the error recovery process as indicated in 908. The switching of the automatic recovery capability between on and off is instructed by the CPU 131. In a case of an error occurred in the "recording", both the transmission FIFO 146 and the recording FIFO 142 are cleared. This is because the transmission FIFO 146 has to be cleared due to interrupted sequence of audio data. The recording FIFO 142 is to be cleared in order to reset the number of samples of audio data of the recording FIFO 142 at the timing at which an SOF is received from the PC to the most suitable value.

In the case of the condition (4) where the recording FIFO 142 is full, the operation may be continued by deleting, from the recording FIFO 142, data which is to be transferred to the transmission FIFO 146 next without turning to "transmission disabled" and "recording stopped". In the case of the condition (4) where the recording FIFO 142 is short of audio data, the operation may be continued by writing a certain amount of dummy audio data formed of samples of zero values into the recording FIFO 142 without turning to "transmission disabled" and "recording stopped". In these cases, the sound will be discontinued, but the operation can be continued.

The condition (5) is a branch taken in a case of "in process of recording" and "transmission enabled" with "IN". In this case, the recording control portion 141 enters the state 905 to conduct DMA-transfer from the recording FIFO 142 to the transmission FIFO 146. The recording control portion 141 then returns to the waiting for SOF state 902.

A typical flow in which the PC 100 inputs audio data output from the DSP 139 is as follows: First, the recording control portion 141 moves from the state 901 to the state 902 to take the branch of the condition (1) to turn to "in process of recording", that is, to enable the transfer of audio data at each sampling period by the recording FIFO 142 from the DSP 139 to the recording FIFO 142. Then, the recording control portion 141 moves from the state 902 to the state 904 to store in the recording FIFO 142 audio data of the amount X which is the most suitable for starting transmission to turn to "transmission enabled". When data of roughly the amount X has been stored, the recording control portion 141 moves to the state 905 to DMA-transfer the data from the recording FIFO 142 to the transmission FIFO 146. The recording control portion 141 then takes the branch of the condition (5) to repeat the cycle of the states 902→905→902 to continue the transmission of the audio data. If an interruption of IN token transmitted from the PC 100 occurs, the branch of the condition of (3) is taken to move from the state 902 to the state 906 to delete a frame of audio data to continue the operation. If an error caused by the recording FIFO 142 which is full or short of data occurs, the branch of the condition (4) is taken to automatically carry out the error recovery process.

Depending on the intervals between occurrences of SOF and the sampling frequency, the size of data which is to be transmitted in accordance with an SOF subtly varies. Even though 6 samples are basically to be transferred in one frame, for example, there are cases in which 5 or 7 samples are transferred in a frame due to irregular SOF cycles. However, because a few patterns of possible number of samples can be identified, respective sizes of data which is to be transferred can be figured out on the basis of the identified patterns. In a case where a varying size of data which is to be transferred does not match with any of the identified possible sizes, the varying size may be adjusted so that the adjusted size will not exceed the largest identified size. In such a case, alternatively, the transfer of such data may be detected as "data size error". In the case of the "data size error", the branch of the condition (4) may be taken.

In a case, which is not indicated in FIGS. 8 and 9, where the PC 100 stops the input of audio data, an input stop command is transmitted to the device 120 by control transfer. In response to the command, the CPU 131 of the integrated circuit 121 instructs the recording control portion 141 to stop its operation. The recording control portion 141 which received the instruction turns to "transmission disabled" and "recording stopped", also stopping the automatic transmission (rerecording) capability to move to the idle state 909.

As explained with reference to FIG. 7 and FIG. 8, the transfer sequences for "reproduction" and "recording" and the operation such as DMA-transfer to the reception FIFO or the transmission FIFO are realized by automatic processing by the reproduction control portion 143 and the recording control portion 141 which are hardware, placing little burden on the CPU 131. For input/output of audio data by conventional USB devices, a CPU is interrupted at each frame period so that the CPU will control a USB interface and conduct DMA control. In this embodiment, however, because the reproduction control portion 143 and the recording control portion 141 which are the hardware conduct the control, the load placed on the CPU 131 can be lightened. In addition, the error detection and the automatic recovery process of the case of occurrence of an irregular operation occurred at the "reproduction" or "recording" can be done under the control of the reproduction control portion 143 and the recording control portion 141, lightening the load on the CPU 131.

Although the USB 1.1 is used in the above-described embodiment, other standards such as USB 2.0 may be employed.

What is claimed is:

1. An audio data outputting apparatus for receiving, from a host apparatus at predetermined frame periods, audio data supplied via a communication bus, performing processing, and then outputting the audio data, the audio data outputting apparatus comprising:

a receiving portion which has a first-in, first-out reception buffer, and performs, in accordance with a request for output transmitted from the host apparatus to the audio data outputting apparatus via the communication bus at the predetermined frame periods, a receiving operation of receiving a plurality of samples of audio data for a plurality of channels transmitted from the host apparatus via the communication bus, and writing the received audio data for the channels into the reception buffer;

a reproducing portion which has a first-in, first-out reproduction buffer and performs a reproducing operation of reading out one sample of the audio data for the channels stored in the reproduction buffer to output the read data at predetermined sampling periods;

a processor which controls at least part of the audio data outputting apparatus; and a controller which controls respective operations of the receiving portion and the reproducing portion in accordance with an instruction from the processor, the processor providing, when receiving, from the host apparatus via the communication bus, a parameter relating to audio data which is to be received, the parameter to the controller; and instructing, when receiving, from the host apparatus via the communication bus, an instruction to start output of audio data, the controller to start operating;

wherein the controller is configured for clearing, in accordance with the instruction from the processor to start operating, the reception buffer and the reproduction buffer, enabling the receiving operation of the receiving portion, and stopping the reproducing operation of the reproducing portion, and thereafter at the predetermined frame periods, transferring, if the receiving portion has received audio data with the reproducing operation of the reproducing portion being stopped, the received audio data from the reception buffer to the reproduction buffer, and instructing, when audio data stored in the reproduction buffer reaches a threshold amount, the reproducing portion to start the reproducing operation;

transferring, if the receiving portion has received audio data with the reproducing portion being in the reproducing operation, the received audio data from the reception buffer to the reproduction buffer;

stopping, if the receiving portion is not receiving audio data, the reproducing operation of the reproducing portion; and stopping, if the receiving portion has received audio data with the reproduction buffer being full or short of data, the reproducing operation of the reproducing portion, clearing audio data stored in the reproduction buffer, and transferring the received audio data from the reception buffer to the reproduction buffer as an automatic recovery process.

2. The audio data outputting apparatus according to claim 1, wherein the processor instructs the controller to enable or disable the automatic recovery process; and in a state where the automatic recovery process is enabled, the controller performs the automatic recovery process operation, whereas in a state where the automatic recovery process is disabled, the controller stops the operation performed at the predefined frame periods instead and thereafter keeps stopping the operation.

3. The audio data outputting apparatus according to claim 1, wherein when the processor receives, from the host apparatus via the communication bus, an instruction to stop output, the processor instructs, in response to the instruction, the controller to stop operating; and in response to the instruction to stop operating, the controller stops the reproducing operation of the reproducing portion.

4. The audio data outputting apparatus according to claim 1, further comprising:

a digital signal processing portion which receives audio data output from the reproducing portion, and individually performs signal processing for audio data of the respective channels at predetermined sampling periods, wherein the processor sets a parameter relating to audio data which is to be received.

5. The audio data outputting apparatus according to claim 1, wherein the parameter relating to audio data includes at least one of parameters indicative of sampling frequency of the audio data, the number of bits of a sample, and the number of channels.

6. An audio data inputting apparatus for receiving external audio data, performing processing, and then supplying the audio data to a host apparatus via a communication bus at predetermined frame periods, the audio data inputting apparatus comprising:

a recording portion which has a first-in, first-out recording buffer, and performs a recording operation of writing one sample of the external audio data for a plurality of channels into the recording buffer at predetermined sampling periods;

a transmitting portion which has a first-in, first-out transmission buffer, and performs, in accordance with a request for input transmitted from the host apparatus to the audio data inputting apparatus via the communication bus at the predetermined frame periods, a transmitting operation of transmitting a plurality of samples of audio data for the plurality of channels stored in the transmission buffer to the host apparatus via the communication bus;

a processor which controls at least part of the audio data inputting apparatus; and a controller which controls respective operations of the transmitting portion and the recording portion in accordance with an instruction from the processor, the processor providing, when receiving, from the host apparatus via the communication bus, a parameter relating to audio data which is to be transmitted, the parameter to the controller; and instructing, when receiving, from the host apparatus via the communication bus, an instruction to start input of audio data, the controller to start operating;

wherein the controller is configured for clearing, in accordance with the instruction from the processor to start operating, the transmission buffer and the recording buffer, disabling the transmitting operation of the transmitting portion, stopping the recording operation of the recording portion, and thereafter at the predetermined frame periods, instructing, if the recording operation of the recording portion is being stopped, the recording portion to start the recording operation;

transferring, if the recording portion is in the recording operation with the transmitting operation of the transmitting portion being disabled, the audio data stored in the recording buffer to the transmission buffer, and enabling, if audio data stored in the recording buffer reaches a threshold amount, the transmitting operation of the transmitting portion;

transferring, if the recording portion is in the recording operation with the transmitting operation of the transmitting portion being enabled and if the audio data inputting apparatus receives the request for input transmitted from the host apparatus, audio data stored in the recording buffer to the transmission buffer; and if the recording portion is in the recording operation with the transmitting operation of the transmitting portion being enabled and if the audio data inputting apparatus does not receive the request for input transmitted from the host apparatus, (a) deleting audio data for a frame period stored in the transmission buffer and transferring audio data stored in the recording buffer to the transmission buffer or (b) deleting audio data for a frame period stored in the recording buffer.

7. The audio data inputting apparatus according to claim 6, wherein the processor instructs the controller which selection to perform, the above-described (a) or (b); and in accordance with the instruction, the controller performs either the above-described (a) or (b).

8. The audio data inputting apparatus according to claim 6, wherein at the predetermined frame periods, if the recording portion is in the recording operation with the transmitting operation of the transmitting portion being enabled and if the recording buffer is full or short of data, the controller disables the transmitting operation of the transmitting portion, and clears audio data stored in the recording buffer and transmission buffer as an automatic recovery process.

9. The audio data inputting apparatus according to claim 8, wherein the processor instructs the controller to enable or disable the automatic recovery process; and in a state where the automatic recovery process is enabled, the controller performs the automatic recovery process operation, whereas in a state where the automatic recovery process is disabled, the controller stops the operation performed at the predefined frame periods instead and thereafter keeps stopping the operation.

10. The audio data inputting apparatus according to claim 6, wherein when the processor receives, from the host apparatus via the communication bus, an instruction to stop input, the processor instructs, in response to the instruction, the controller to stop operating; and in response to the instruction to stop operating, the controller stops the recording operation of the recording portion.

11. The audio data inputting apparatus according to claim 6, further comprising:

a digital signal processing portion which receives the received external audio data, individually performs signal processing for audio data of the respective channels at predetermined sampling periods, and outputs the processed audio data to the recording portion, wherein the processor sets a parameter relating to audio data which is to be received.

12. The audio data inputting apparatus according to claim 6, wherein the parameter relating to audio data includes at least one of parameters indicative of sampling frequency of the audio data, the number of bits of a sample, and the number of channels.

13. An audio data outputting apparatus for receiving, from a host apparatus at predetermined frame periods, audio data supplied via a communication bus, and then outputting the audio data, the audio data outputting apparatus comprising:
   a receiving portion which performs a receiving operation of receiving audio data transmitted from the host apparatus via the communication bus;
   a reproducing portion which has a reproduction buffer and performs a reproducing operation of reading out one sample of the audio data stored in the reproduction buffer to output the read data at predetermined sampling periods;
   a processor which controls at least part of the audio data outputting apparatus; and a controller which controls respective operations of the receiving portion and the reproducing portion in accordance with an instruction from the processor, the processor
   instructing, when receiving from the host apparatus via the communication bus an instruction to start output of audio data, the controller portion to start operating;
   wherein the controller is configured for clearing, in accordance with the instruction from the processor to start operating, the reproduction buffer, enabling the receiving operation of the receiving portion, and thereafter transferring the received audio data from the reception portion to the reproduction buffer at the predetermined frame periods;
   instructing, at a frame period in which audio data stored in the reproduction buffer reaches a threshold amount, the reproducing portion to start the reproducing operation; and
   stopping, if the receiving portion has received audio data with the reproduction buffer being full or short of data, the reproducing operation of the reproducing portion, clearing audio data stored in the reproduction buffer, and instructing, at a frame period in which audio data stored in the reproduction buffer reaches a threshold amount, the reproducing portion to start the reproducing operation as an automatic recovery process.

14. An audio data inputting apparatus for receiving external audio data and then supplying the audio data to a host apparatus via a communication bus at predetermined frame periods, the audio data inputting apparatus comprising:
   a recording portion which has a recording buffer and performs a recording operation of writing the external audio data into the recording buffer at predetermined sampling periods;
   a transmitting portion which has a transmission buffer and performs, in accordance with a request for input transmitted from the host apparatus to the audio data inputting apparatus via the communication bus at the predetermined frame periods, a transmitting operation of transmitting audio data stored in the transmission buffer to the host apparatus via the communication bus;
   a processor which controls at least part of the audio data inputting apparatus; and
   a controller which controls respective operations of the transmitting portion and the recording portion in accordance with an instruction from the processor, the processor
   instructing, when receiving from the host apparatus via the communication bus an instruction to start input of audio data, the controller to start operating;
   wherein the controller is figured for clearing, in accordance with the instruction from the processor to start operating, the transmission buffer and the recording buffer, instructing the recording portion to start the recording operation, and thereafter transferring audio data from the recording buffer to the transmission buffer at the predetermined frame periods;
   enabling, at a frame period in which audio data stored in the recording buffer reaches a threshold amount, the transmitting operation of the transmitting portion, and
   if the audio data inputting apparatus does not receive the request for input transmitted from the host apparatus, (a) deleting audio data for a frame period stored in the transmission buffer and transferring audio data stored in the recording buffer to the transmission buffer, or (b) deleting audio data for a frame period stored in the recording buffer.

* * * * *